United States Patent
Chen et al.

(10) Patent No.: US 10,810,993 B2
(45) Date of Patent: Oct. 20, 2020

(54) SAMPLE-EFFICIENT ADAPTIVE TEXT-TO-SPEECH

(71) Applicant: DeepMind Technologies Limited, London (GB)

(72) Inventors: Yutian Chen, Cambridge (GB); Scott Ellison Reed, New York, NY (US); Aaron Gerard Antonius van den Oord, London (GB); Oriol Vinyals, London (GB); Heiga Zen, Epsom (GB); Ioannis Alexandros Assael, London (GB); Brendan Shillingford, London (GB); Joao Ferdinando Gomes de Freitas, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/666,043

(22) Filed: Oct. 28, 2019

(65) Prior Publication Data
US 2020/0135172 A1    Apr. 30, 2020

(30) Foreign Application Priority Data
Oct. 26, 2018 (GR) ............................... 20180100486

(51) Int. Cl.
*G10L 13/047* (2013.01)
*G06N 3/08* (2006.01)
(Continued)

(52) U.S. Cl.
CPC .............. *G10L 13/047* (2013.01); *G06N 3/08* (2013.01); *G10L 13/033* (2013.01); *G10L 13/043* (2013.01)

(58) Field of Classification Search
CPC ... G10L 13/047; G10L 13/033; G10L 13/043; G06N 3/08
(Continued)

(56) References Cited

U.S. PATENT DOCUMENTS

2006/0230140 A1* 10/2006 Aoyama .................. G06N 3/08
                                                          709/224
2011/0087488 A1*  4/2011 Morinaka ............. G10L 13/033
                                                          704/207
(Continued)

OTHER PUBLICATIONS

Abdel-Hamid et al., "Fast speaker adaptation of hybrid NN/HMM model for speech recognition based on discriminative learning of speaker code," 2013 IEEE International Conference on Acoustics, Speech and Signal Processing (ICASSP), May 2013, 7942-7946.
(Continued)

*Primary Examiner* — Edwin S Leland, III
(74) *Attorney, Agent, or Firm* — Fish & Richardson P.C.

(57) ABSTRACT

Methods, systems, and apparatus, including computer programs encoded on computer storage media, for generating an adaptive audio-generation model. One of the methods includes generating an adaptive audio-generation model including learning a plurality of embedding vectors and parameter values of a neural network using training data comprising first text and audio data representing a plurality of different individual speakers speaking portions of the first text, wherein the plurality of embedding vectors represent respective voice characteristics of the plurality of different individual speakers. The adaptive audio-generation model is adapted for a new individual speaker using adaptation data comprising second text and audio data representing the new individual speaker speaking portions of the second text, the new individual speaker being different from each of the plurality of individual speakers, wherein adapting the audio-
(Continued)

generation model includes learning a new embedding vector for the new individual speaker.

20 Claims, 5 Drawing Sheets

(51) Int. Cl.
   *G10L 13/033* (2013.01)
   *G10L 13/04* (2013.01)
(58) Field of Classification Search
   USPC .......................................................... 704/259
   See application file for complete search history.

(56) References Cited

U.S. PATENT DOCUMENTS

| | | | | |
|---|---|---|---|---|
| 2013/0262119 | A1* | 10/2013 | Latorre-Martinez | ........................ G10L 13/033 704/260 |
| 2014/0379348 | A1* | 12/2014 | Sung | ........................ G10L 25/75 704/254 |
| 2017/0069327 | A1* | 3/2017 | Heigold | ................... G10L 17/02 |
| 2017/0076713 | A1* | 3/2017 | Gildein, II | ............ G10L 13/043 |
| 2018/0032871 | A1* | 2/2018 | Holt | ........................ G06N 3/084 |
| 2018/0082679 | A1* | 3/2018 | McCord | ................. G10L 13/033 |
| 2020/0005763 | A1* | 1/2020 | Chae | ..................... G10L 13/033 |
| 2020/0005764 | A1* | 1/2020 | Chae | ..................... G10L 13/047 |
| 2020/0135172 | A1* | 4/2020 | Chen | ..................... G10L 13/033 |

OTHER PUBLICATIONS

Andrychowicz et al., "Learning to learn by gradient descent by gradient descent," https://arxiv.org/abs/1606.04474, last revised Nov. 2016, 17 pages.
Arik et al., "Deep Voice 2: Multi-Speaker Neural Text-to-Speech," https://arxiv.org/abs/1705.08947, last revised Sep. 2017, 15 pages.
Arik et al., "Deep Voice: Real-time Neural Text-to-Speech," https://arxiv.org/abs/1702.07825, last revised Mar. 2017, 17 pages.
Arik et al., "Neural Voice Cloning with a Few Samples," https://arxiv.org/abs/1802.06006, last revised Oct. 2018, 18 pages.
Aytar et al., "Playing hard exploration games by watching YouTube," https://arxiv.org/abs/1805.11592v1, May 2018, 10 pages.
Bartunov et al., "Fast Adaptation in Generative Models with Generative Matching Networks," https://arxiv.org/abs/1612.02192, last revised Sep. 2017, 16 pages.
Bornschein et al., "Variational Memory Addressing in Generative Models," https://arxiv.org/abs/1709.07116, Sep. 2017, 12 pages.
Chen et al., "Learning to learn without gradient descent by gradient descent," https://arxiv.org/abs/1611.03824, Jun. 2017, 9 pages.
Dall et al., "Redefining the Linguistic Context Feature Set for HMM and DNN TTS Through Position and Parsing," in INTERSPEECH 2016, Sep. 2016, 2851-2855.
de Cheveigné et al., "YIN, a fundamental frequency estimator for speech and music," The Journal of the Acoustical Society of America, Apr. 2002, 111(4):1917-1930.
Ebden et al., "The Kestrel TTS text normalization system," Natural Language Engineering, May 2015, 21(3):333-353.
Finn et al., "Model-Agnostic Meta-Learning for Fast Adaptation of Deep Networks," https://arxiv.org/abs/1703.03400, last revised Jul. 2017, 13 pages.
Finn et al., "One-Shot Visual Imitation Learning via Meta-Learning," https://arxiv.org/abs/1709.04905, Sep. 2017, 12 pages.
Gregor et al., "DRAW: A Recurrent Neural Network for Image Generation," https://arxiv.org/abs/1502.04623, last updated May 2015, 10 pages.
Harlow, "The Formation of Learning Sets," Psychological Review, Jan. 1949, 56(1):51-65.
Hinton et al., "Deep Neural Networks for Acoustic Modeling in Speech Recognition: The shared views of four research groups," IEEE Signal Processing Magazine, Nov. 2012, 29(6):82-97.
Jia et al., "Transfer Learning from Speaker Verification to Multispeaker Text-To-Speech Synthesis," https://arxiv.org/abs/1806.04558v2, Oct. 2018, 15 pages.
Kalchbrenner et al., "Efficient Neural Audio Synthesis," https://arxiv.org/abs/1802.08435, last updated Jun. 2018, 10 pages.
Krizhevsky et al., "ImageNet Classification with Deep Convolutional Neural Networks," Advances in Neural Information processing Systems, 2012, 9 pages.
Li et al., "Deep Speaker Feature Learning for Text-independent Speaker Verification," https://arxiv.org/abs/1705.03670, May 2017, 5 pages.
Morise et al., "WORLD: A Vocoder-Based High-Quality Speech Synthesis System for Real-Time Applications," IEICE Transactions on Information and Systems, Jul. 2016, 99(7):1877-1884.
Nachman et al., "Fitting New Speakers Based on a Short Untranscribed Sample," https://arxiv.org/abs/1802.06984, Feb. 2018, 9 pages.
Panayotov et al., "Librispeech: An ASR corpus based on public domain audio books," 2015 IEEE International Conference on Acoustics, Speech and Signal Processing, Apr. 2015, 5206-5210.
Ping et al., "Deep Voice 3: Scaling Text-to-Speech with Convolutional Sequence Learning," https://arxiv.org/abs/1710.07654, last revised Feb. 2018, 16 pages.
Pohlen et al., "Observe and Look Further: Achieving Consistent Performance on Atari," https://arxiv.org/abs/1805.11593, May 2018, 19 pages.
Ravi et al., "Optimization as a model for few-shot learning," International Conference on Learning Representations, Nov. 2016, 10 pages.
Reed et al., "Few-shot Autoregressive Density Estimation: Towards Learning to Learn Distributions," https://arxiv.org/abs/1710.10304, last revised Feb. 2018, 11 pages.
Rezende et al., "One-Shot Generalization in Deep Generative Models," https://arxiv.org/abs/1603.05106, last revised May 2016, 10 pages.
Santoro et al., "Meta-Learning with Memory-Augmented Neural Networks," International Conference on Machine Learning, Jun. 2016, 9 pages.
Shen et al., "Natural TTS Synthesis by Conditioning WaveNet on Mel Spectrogram Predictions," https://arxiv.org/abs/1712.05884, Dec. 2017, 5 pages.
Shyam et al., "Attentive Recurrent Comparators," https://arxiv.org/abs/1703.00767, last revised Jun. 2017, 10 pages.
Skerry-Ryan et al., "Towards End-to-End Prosody Transfer for Expressive Speech Synthesis with Tacotron," https://arxiv.org/abs/1803.09047, Mar. 2018, 11 pages.
Sotelo et al., "Char2Wav: End-to-End Speech Synthesis," International Conference on Learning Representations Workshop, Feb. 2017, 6 pages.
Szegedy et al., "Going deeper with convolutions," https://arxiv.org/abs/1409.4842, Sep. 2014, 12 pages.
Taigman et al., "VoiceLoop: Voice Fitting and Synthesis via a Phonological Loop," https://arxiv.org/abs/1707.06588, Feb. 2018, 14 pages.
Van den Oord et al., "Parallel WaveNet: Fast High-Fidelity Speech Synthesis," https://arxiv.org/abs/1711.10433, Nov. 2017, 11 pages.
van den Oord et al., "Pixel Recurrent Neural Networks," https://arxiv.org/abs/1601.06759, last revised Aug. 2016, 11 pages.
van den Oord et al., "WaveNet: A Generative Model for Raw Audio," http://arxiv.org/abs/1609.03499, Sep. 2016, 15 pages.
Veaux et al., "Superseded—CSTR VCTK Corpus: English Multi-speaker Corpus for CSTR Voice Cloning Toolkit," Apr. 2017, retrieved on Dec. 11, 2019, retrieved from URL <https://datashare.is.ed.ac.uk/handle/10283/2651>, 2 pages.
Veness et al., "Online Learning with Gated Linear Networks," https://arxiv.org/abs/1712.01897, Dec. 2017, 40 pages.
Vinyals et al, "Matching Networks for One Shot Learning," Advances in Neural Information Processing Systems, Dec. 2016, 9 pages.
Wan et al., "Generalized End-to-End Loss for Speaker Verification," 2018 IEEE International Conference on Acoustics, Speech, and Signal Processing, Apr. 2018, 4879-4883.

(56) References Cited

OTHER PUBLICATIONS

Wang et al., "Tacotron: Towards End-to-End Speech Synthesis," https://arxiv.org/abs/1703.10135, Apr. 2017, 10 pages.
Wu et al., "Google's Neural Machine Translation System: Bridging the Gap between Human and Machine Translation," https://arxiv.org/abs/1609.08144, last revised Oct. 2016, 23 pages.
Yu et al., "One-Shot Imitation from Observing Humans via Domain-Adaptive Meta-Learning," https://arxiv.org/abs/1802.01557, Feb. 2018, 12 pages.
Zen et al., "Fast, Compact, and High Quality LSTM-RNN Based Statistical Parametric Speech Synthesizers for Mobile Devices," https://arxiv.org/abs/1606.06061, Jun. 2016, 14 pages.

* cited by examiner

SAMPLE-EFFICIENT ADAPTIVE TEXT-TO-SPEECH

CROSS-REFERENCE TO RELATED APPLICATION

This application claims the benefit under 35 U.S.C. § 119(a) of the filing date of Greek Patent Application No. 20180100486, filed in the Greek Patent Office on Oct. 26, 2018. The disclosure of the foregoing application is herein incorporated by reference in its entirety.

BACKGROUND

This specification relates to signal-generation neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

One example of a neural network is an audio generation neural network. Audio generation neural networks take text as input and generate as output a raw audio waveform of a speaker speaking the text. Realistic audio generation typically requires multiple thousands of samples to be generated per second, e.g., 24,000 samples per second. One example of an audio generation neural network is a WaveNet. WaveNets were initially described in van den Oord et al., *WaveNet: A Generative Model for Raw Audio*, in arXiv preprint arXiv: 1609.03499 (2016), available at arxiv.org. A WaveNet is a deep neural network that models the conditional probability of an audio sample having a particular value given a particular number of previously occurring sample values.

One of the fundamental limitations of realistic audio generation neural networks is that they require large training datasets. Typically, a training system needs hours of audio recordings for each individual speaker represented in the training data. This amount of data is expensive and cumbersome to obtain and curate in general, and there are many use cases in which this volume of training data is impractical or impossible to obtain. For example, one application of text-to-speech models is providing realistic speech capabilities for medical patients who suffer voice-impairing medical conditions. Such patients typically do not have access to hours of audio recordings of themselves speaking.

SUMMARY

This specification describes a system implemented as computer programs on one or more computers in one or more locations that can generate a sample-efficient, adaptive audio-generation model. In this context, being sample-efficient and adaptive means that the model can be customized to emulate the speech of a new speaker with far less training data than was used to train the adaptive model. For example, while training the adaptive model may require hours of audio recordings for each individual speaker, adapting the model for a new speaker may require only a few minutes of audio recordings of the new speaker.

A training system can train the audio-generation model using a plurality of embedding vectors for respective individual speakers and an audio-generation neural network. Because of the computationally intensive nature of the training process, the training can be performed by a distributed computing system, e.g., a datacenter, having hundreds or thousands of computers.

The output of the training process is an adaptive audio-generation model that can be efficiently adapted to a new speaker. Adapting the model generally involves learning a new embedding vector for the new speaker, and may optionally involve fine-tuning the parameters of the neural network for the new speaker. The adaptation data can be only a few seconds or a few minutes of audio recordings of the new speaker. The adaptation process is therefore much less computationally intensive than the original training process. Thus, the adaptation process can be performed on much less powerful hardware, e.g., a mobile phone or another wearable device, a desktop or laptop computer, or another internet-enabled device installed in a user's home, to name just a few examples.

The subject matter described in this specification can be implemented in particular embodiments so as to realize one or more of the following advantages. Adaptive audio-generation model can be used to rapidly adapt to a new speaker using orders of magnitude less data than was used to train the model. This enables the adaptation process to be performed by consumer hardware of end users rather than being performed in a datacenter.

The adaptation technology enables a variety of technological use cases that were previously not possible. For example, realistic voice translations of video or audio content can be generated that emulate the characteristics of a particular speaker without requiring hours of audio recordings of the speaker. As another example, real-time translated video conferencing or phone calls can be generated in which the translation realistically emulates the speaker who does not actually speak the translated language. In addition, an adaptive audio generation model can be used to provide realistic speech capabilities for medical patients suffering voice-impairing medical conditions without requiring such patients to have hours of audio recordings of themselves speaking.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
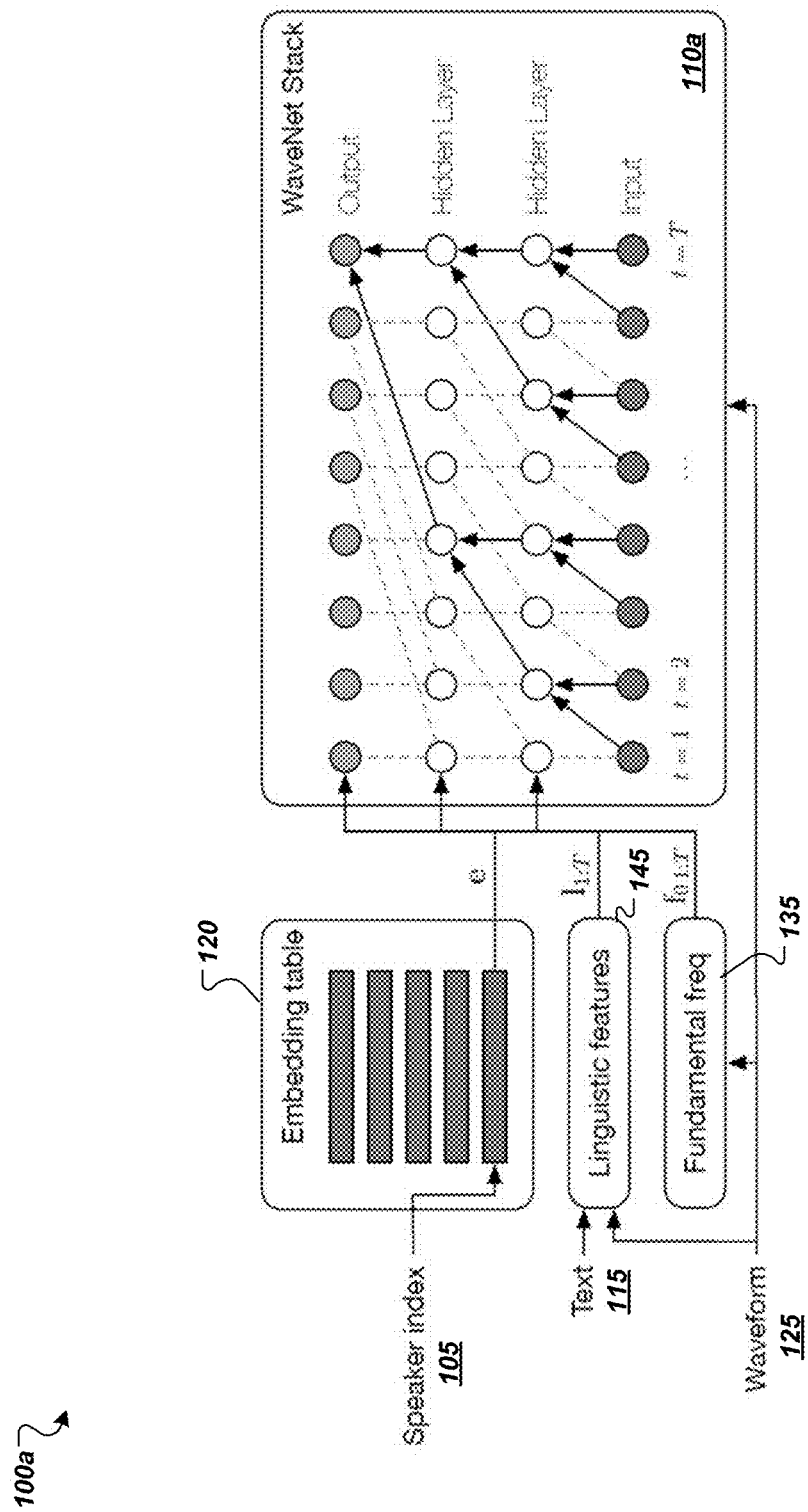
FIG. 1A is a diagram that illustrates an example architecture for training a sample-efficient, adaptive audio-generation model.
Figure 1B:
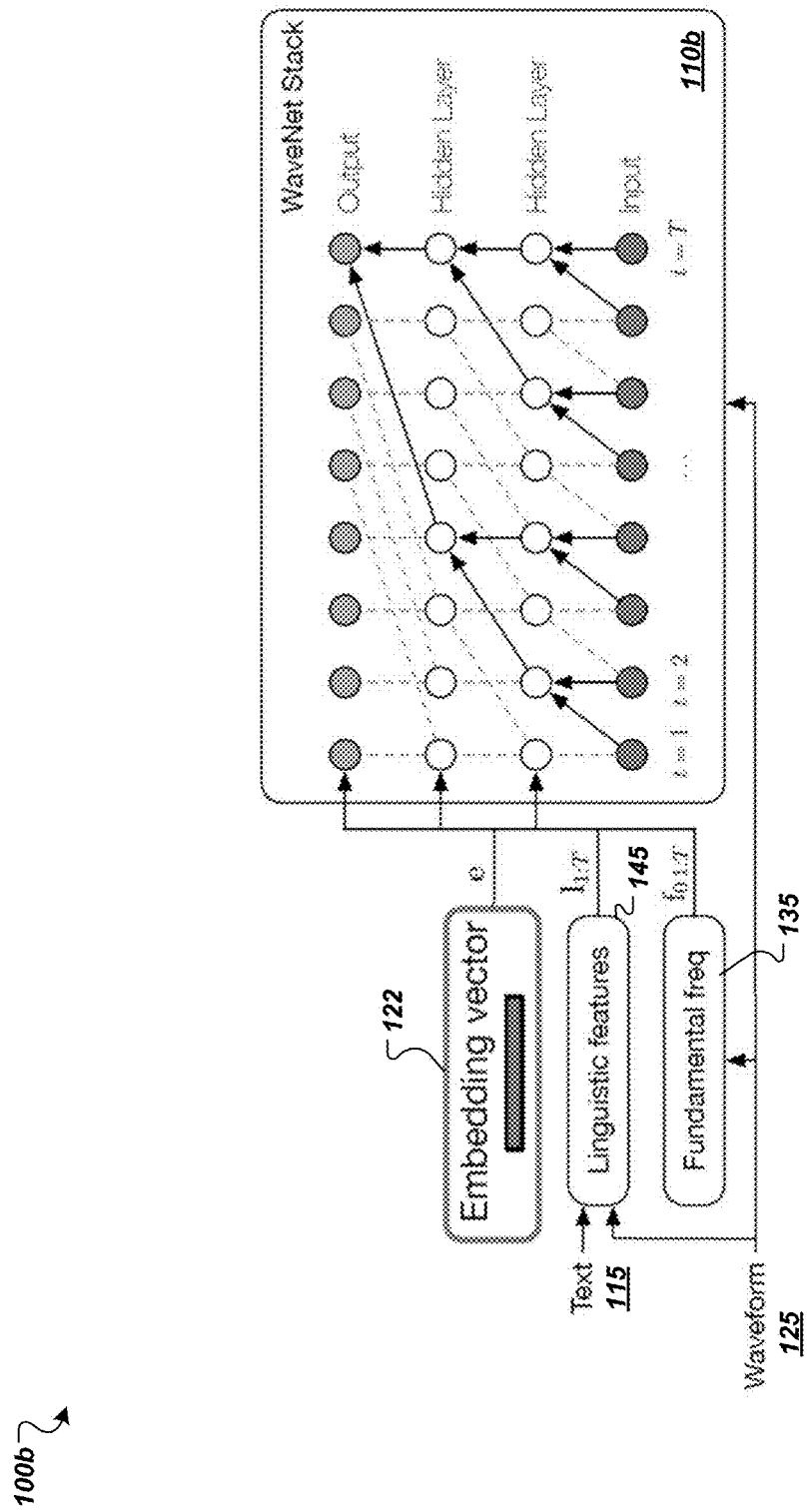
FIG. 1B is a diagram that illustrates an example architecture for adapting a sample-efficient, adaptive audio-generation model to a new individual speaker.
Figure 1C:
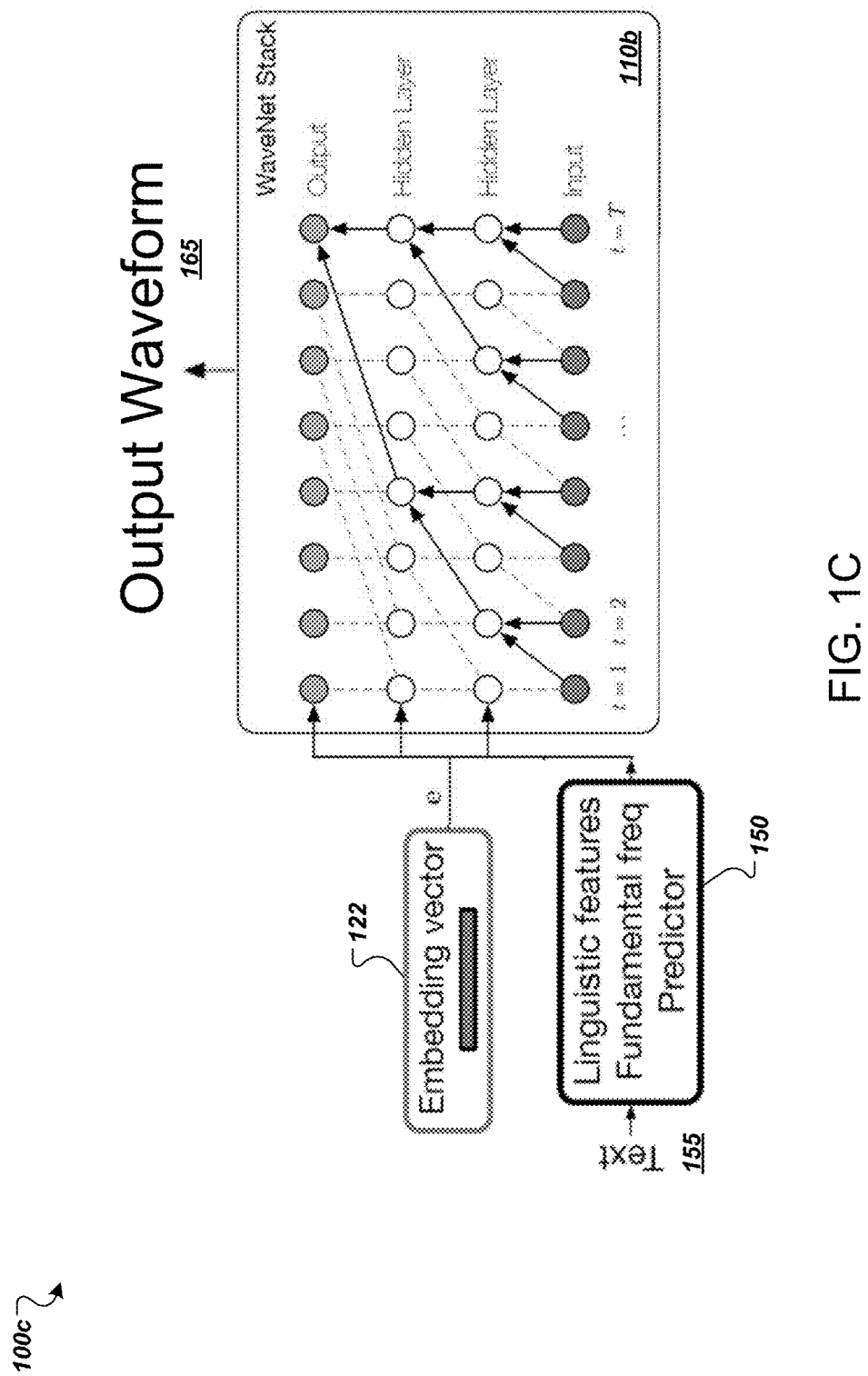
FIG. 1C is a diagram that illustrates an example architecture 100c for performing inference using an adapted sample-efficient, adaptive audio-generation model.

FIGS. 1A, 1B, and 1C respectively illustrate example architectures for training, adapting, and performing inference using a sample-efficient, adaptive audio-generation model. The examples in this specification generally discuss using a WaveNet architecture to implement the audio-generation model. However, the same techniques can also be applied using any other appropriate neural audio-generation model, e.g., the WaveRNN model described in Kalchbrenner et al., *Efficient Neural Audio Synthesis*, in arXiv preprint arXiv:1802.08435 (2016), available at arxiv.org, and the Tacotron 2 model described in Shen et al., *Natural TTS Synthesis by Conditioning WaveNet on Mel Spectrogram Predictions*, in arXiv preprint arXiv:1712.05884 (2017), available at arxiv.org, to name just a few examples.

FIG. 1A is a diagram that illustrates an example architecture 100a for training a sample-efficient, adaptive audio-generation model. The architecture 100a includes a WaveNet Stack 110a that is trained using an embedding table 120 that stores embedding vectors for multiple different respective individual speakers, each individual speaker having a speaker index 105. The components illustrated in FIG. 1A can be implemented by a distributed computing system comprising a plurality of computers that coordinate to train the WaveNet Stack 110a. As described above, the training process can use many different individual speakers using hours of audio waveform data.

During each iteration of training, text 115 and a waveform 125 of audio spoken by an individual corresponding to a value of the speaker index is used as input to the WaveNet Stack 110a. The computing system performing the training process can then iterate over each individual in the embedding table 120 and optionally over multiple different segments of text for each of the individuals.

The WaveNet Stack 110a can be implemented as is an autoregressive model that factorizes the joint probability distribution of a waveform, x={x1, . . . , xT}, into a product of conditional distributions using the probabilistic chain rule:

$$p(x \mid h; w) = \prod_{t=1}^{T} p(x_t \mid x_{1:t-1}, h; w),$$

where $x_t$ is the t-th timestep sample, and h and w are respectively the conditioning inputs and parameters of the model.

To train a multi-speaker WaveNet, the conditioning inputs h consist of the speaker identity s, the linguistic features l, and the logarithmic fundamental frequency f0 values. The variable l encodes the sequence of phonemes derived from the input text, and f0 controls the dynamics of the pitch in the generated utterance. Given the speaker index s for each utterance in the dataset, the model can be expressed as:

$$p(x \mid l, f_0; e_s, w) = \prod_{t=1}^{T} p(x_t \mid x_{1:t-1}, l, f_0; e_s, w),$$

where the embedding table 120 of speaker embedding vectors $e_s$ is learned alongside the standard WaveNet parameters. These vectors capture salient voice characteristics across individual speakers and provide a convenient mechanism for generalizing WaveNet to the sample-efficient adaptation techniques described in this specification.

The linguistic features l 145 and the fundamental frequency values $f_0$ 135 can each be a respective time-series with a lower sampling frequency than the waveform 125. Thus, to be used as local conditioning variables, the linguistic features 145 and fundamental frequency values 135 can be upsampled by a transposed convolutional network. During training, l 145 and $f_0$ 135 can be extracted by signal processing methods from pairs of training utterance and transcript. During testing, those values can be predicted from text by existing models.

FIG. 1B is a diagram that illustrates an example architecture 100b for adapting a sample-efficient, adaptive audio-generation model to a new individual speaker. During the adaptation process, the parameters learned during training are adjusted so that they are adapted to a particular individual's voice characteristics. In other words, the purpose of the training process illustrated in FIG. 1A is to learn a prior. During adaptation, this prior is combined with new data to rapidly adapt to a new speakers' voice characteristics.

The architecture 100b includes a WaveNet Stack 110b whose parameters have been adjusted according to a new embedding vector 122 that represents the characteristics of a new speaker. The new embedding vector 122 can be generated in a variety of ways, which are discussed in more detail below with reference to FIG. 2.

FIG. 1C is a diagram that illustrates an example architecture 100c for performing inference using an adapted sample-efficient, adaptive audio-generation model. During the inference process, new text 155 and the embedding vector 122 generated for the new speaker are used as input to generate an output waveform 165 having characteristics of the new speaker. As part of this process, a predictor 150 that uses existing models to generate linguistic features and fundamental frequencies of the new speaker 150 from the new text 155.

Figure 2:
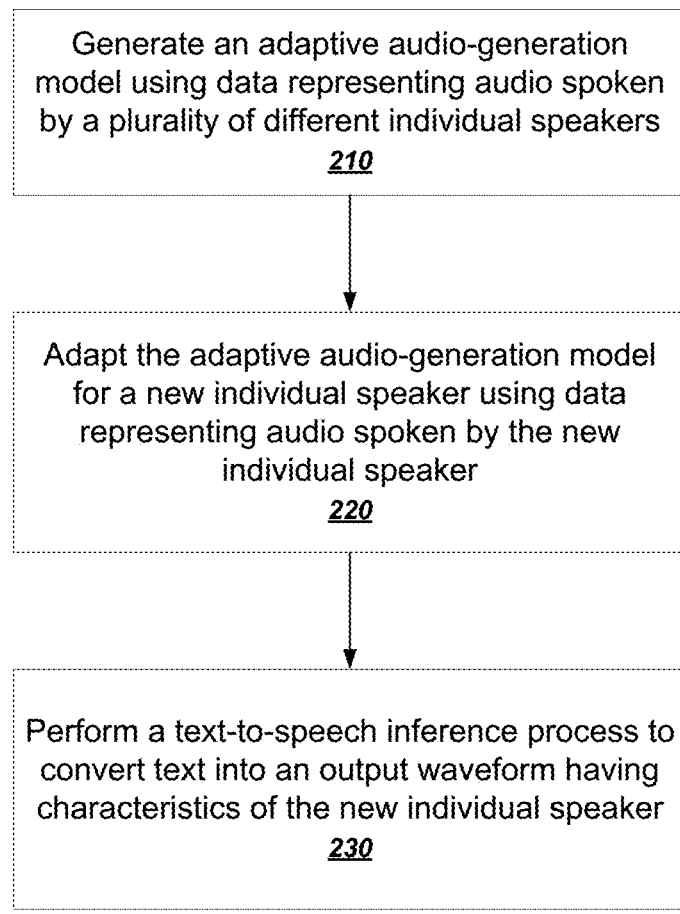
FIG. 2 is a flowchart of an example process for generating and using a sample-efficient, adaptive audio-generation model.

FIG. 2 is a flowchart of an example process for generating and using a sample-efficient, adaptive audio-generation model. As described above, the process includes three stages: training, adaptation, and inference. Typically the training stage is performed on a distributed computing system having multiple computers. And as described above, the other two stages can be performed on much less computationally expensive hardware, e.g., a desktop computer, laptop computer, or mobile computing device. For convenience, the example process will be described as being performed by a system of one or more computers.

The system generates an adaptive audio-generation model using data representing audio spoken by a plurality of different individual speakers (210). As described above with reference to FIG. 1A, the system can generate different embedding vectors for a plurality of individual speakers. The system can then train parameter values of a neural audio-generation model, e.g., a WaveNet stack, a WaveRNN model, or a Tacotron 2 model, using training data that includes text and audio data representing a plurality of different individual speakers speaking portions of the text. Each of the embedding vectors generally represents respective voice characteristics of the plurality of different individual speakers.

The system adapts the adaptive audio-generation model for a new individual speaker using data representing audio spoken by the new individual speaker (220). As described above with reference to FIG. 1B, the adaptation process uses audio data representing the new individual speaker speaking portions of text.

Generally the data used for the adaptation process can be orders of magnitude smaller than data used for the training process. In some implementations, the training data comprises multiple hours of audio recordings for each individual speaker of the plurality of different individual speakers, while the adaptation process can use less than ten minutes of audio recordings of the new individual speaker.

In addition, the adaptation process is generally much less computationally intensive than the training process. Thus, in some implementations the training process is performed in a datacenter having tens or hundreds or thousands of computers, while the adaptation process is performed on a mobile device or a single, Internet-enabled device.

The system can generate a new embedding vector using the audio data to be used for adapting the model to the new individual speaker. Generally, the new embedding vector can be different from any of the embedding vectors used during the training process.

The adaptation process can be performed in multiple ways. In particular, the system can use a non-parametric technique or a parametric technique.

The non-parametric technique involves adapting the new speaker embeddings, the model parameters, or both, using held-aside demonstration data. For example, the system can fine-tune the model parameters by retraining with respect to held-aside adaptation data.

For example, when training a WaveNet model to maximize the conditional log-likelihood of the generated audio, the system can jointly optimize both the set of speaker parameters $\{e_s\}$ and the shared WaveNet core parameters w. The system can then extend the model to a new speaker by extracting the l and $f_0$ features from their adaptation data and randomly initializing a new embedding vector e. The new embedding vector e can then be optimized such that the demonstration waveforms, $\{x(1)_{demo}, \ldots x(n)_{demo}\}$ paired with features $\{l^{(1)}_{demo}, f_0^{(1)}_{demo}), \ldots (l^{(n)}_{demo}, f^{(n)}_{demo})\}$ that are most likely, e.g., by satisfying a likelihood threshold under the model with w fixed (SEA-EMB):

$$e_{demo} = \arg\max_e \sum_i \log p(x_{demo}^{(i)} \mid l_{demo}^{(i)}, f_{0,demo}^{(i)}; e, w).$$

Alternatively, all of the model parameters may be additionally fine-tuned (SEA-ALL):

$$(e_{demo}, w_{finetuned}) = \arg\max_{e,w} \sum_i \log p(x_{demo}^{(i)} \mid l_{demo}^{(i)}, f_{0,demo}^{(i)}; e, w).$$

Both non-parametric approaches to sample-efficient voice adaptation as the number of embedding vectors scales with the number of speakers. However, the training processes are slightly different. Because the SEA-EMB method optimizes only a low-dimensional vector, it is far less prone to overfitting, and the system is therefore able to retrain the model to convergence even with mere seconds of adaptation data. By contrast, the SEA-ALL has many more parameters that might overfit to the adaptation data. To address this issue, the system can hold out a particular fraction, e.g., 5%, 10%, or 15%, of the demonstration data for calculating a standard early termination criterion. The system can also pre-initialize e with the optimal value from the SEA-EMB method, which can significantly improve the generalization performance even with just a few seconds of adaptation data.

Alternatively or in addition, the system can use a parametric technique that involves training an auxiliary network to predict the embedding vector of a new speaker using the demonstration data.

In contrast to the non-parametric approach, whereby a different embedding vector is fitted for each speaker, the system can train an auxiliary encoder network to predict an embedding vector for a new speaker given their demonstration data. Specifically, the system can model:

$$p(x \mid l, f_0, x_{demo}, l_{demo}, f_{0,demo}; w) = \prod_{t=1}^{T} p(x_t \mid x_{1:t-1}, l, f_0; e(x_{demo}, l_{demo}, f_{0,demo}), w),$$

where for each training example, a randomly selected demonstration utterance from that speaker is included in addition to the regular conditioning inputs. The full WaveNet model and the encoder network e( ) can then be trained together from scratch. This technique is described in more detail below with reference to FIG. 3.

In general, the parametric approach (SEA-ENC) exhibits the advantage of being trained in a transcript-independent setting given only the input waveform, $e(x_{demo})$, and requires negligible computation at adaptation time. However, the learned encoder can also introduce bias when fitting an embedding due to its limited network capacity.

The system performs a text-to-speech inference process to convert text into an output waveform having characteristics of the new individual speaker (230). In general, the system uses the audio-generation model adapted for the new individual speaker, which includes using as input the new embedding vector for the individual speaker and features of a new portion of text. This process can also include automatically generating audio of a translation of video or audio content in which the audio of the translation is adapted to have the characteristics of the new speaker. As one example, this process can be performed during a video conference or a phone call such that audio of the translation is adapted to the characteristics of the new speaker.

Figure 3:
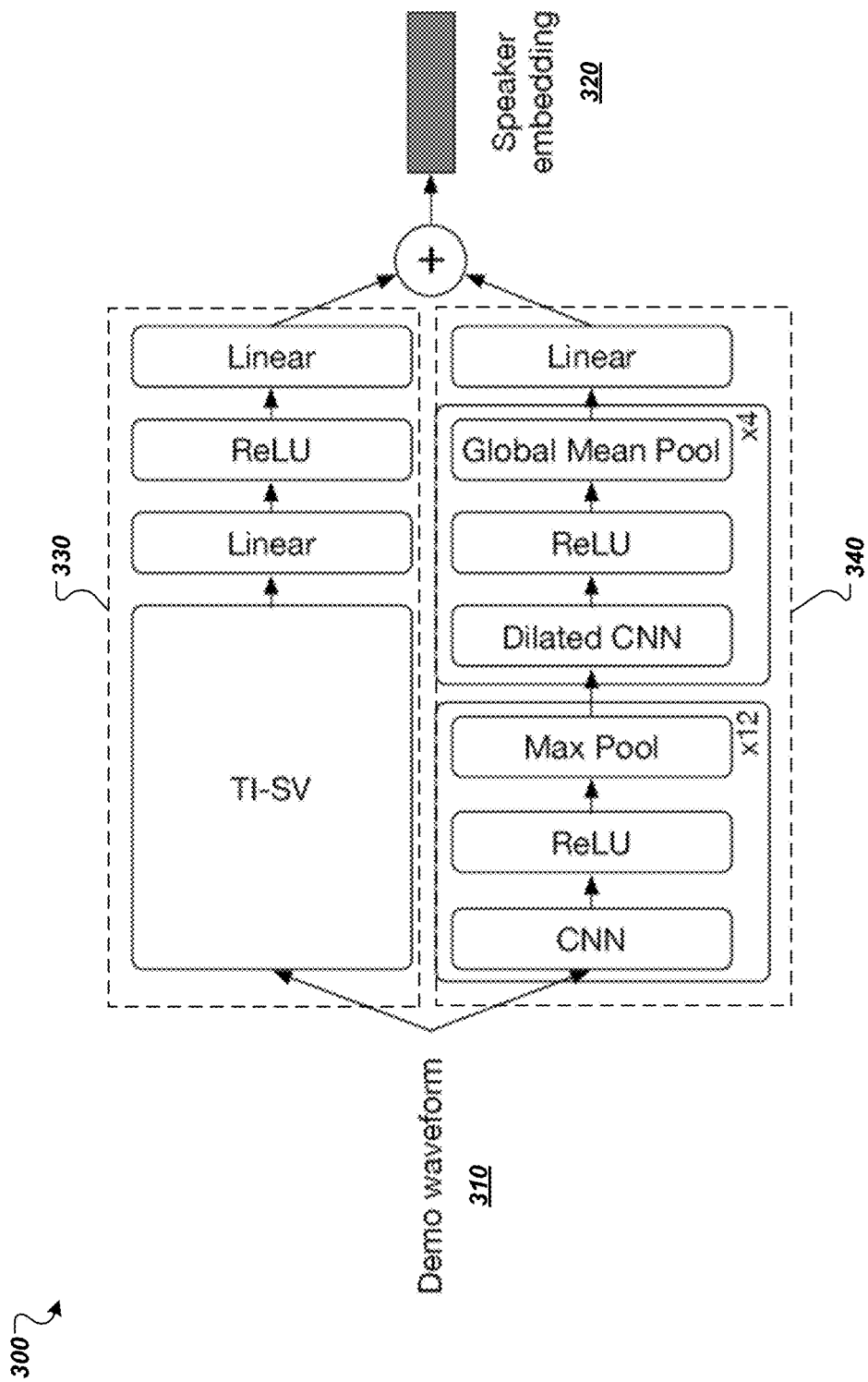
FIG. 3 is a diagram that illustrates an example architecture 300 for an embedding encoder for predicting speaker embeddings.

FIG. 3 is a diagram that illustrates an example architecture 300 for an embedding encoder for predicting speaker embeddings. In general, the embedding encoder takes as input a demo waveform 310 and generates a predicted speaker embedding 320. In other words, the embedding encoder predicts an embedding vector for a speaker when given adaptation data for the speaker. The embedding encoder network is illustrated as the summation of the output of two sub-networks 330 and 340.

The first subnetwork 330 is a pre-trained speaker verification model (TI-SV) comprising 3 LSTM layers and a single linear layer. The first subnetwork 330 generally maps a waveform sequence of arbitrary length to a fixed dimensional d-vector with a sliding window. The first subnetwork 330 can be trained from utterances of speakers extracted from anonymized voice search logs. The first subnetwork 330 also includes a shallow MLP to project the output d-vector to the speaker embedding space.

The second subnetwork 340 includes 16 1-D convolutional layers. The second subnetwork 340 essentially reduces the temporal resolution, e.g., to 256 ms per frame for 16 kHz audio), and then averages across time and projects into the speaker embedding space. The purpose of the second subnetwork 340 is to extract residual speaker information present in the demonstration waveforms but not captured by the pre-trained TI-SV model.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   generating an adaptive audio-generation model including learning a plurality of embedding vectors and parameter values of a neural network using training data comprising first text and audio data representing a plurality of different individual speakers speaking portions of the first text, wherein the plurality of embedding vectors represent respective voice characteristics of the plurality of different individual speakers; and
   adapting the adaptive audio-generation model for a new individual speaker using adaptation data comprising second text and audio data representing the new individual speaker speaking portions of the second text, the new individual speaker being different from each of the plurality of individual speakers, wherein adapting the audio-generation model includes (i) learning values of a new embedding vector for the new individual speaker and (ii) adjusting the parameter values of the neural network that were learned during the generation of the adaptive audio-generation model.

2. The method of claim 1, wherein the audio-generation model adapted for the new individual speaker does not use any of the plurality of embedding vectors for the plurality of individual speakers in the training data.

3. The method of claim 1, wherein generating the adaptive audio-generation model comprises learning a different respective embedding vector for each of the plurality of individual speakers.

4. The method of claim 3, wherein adapting the adaptive audio-generation model comprises extracting features from the adaptation data and learning values of the new embedding vector that are most likely according to the learned parameter values of the audio-generation model.

5. The method of claim 3, wherein adapting the adaptive audio-generation model comprises extracting features from the adaptation data and using at least the extracted features to learning both values of the new embedding vector and new parameter values for the neural network.

6. The method of claim 5, further comprising:
   pre-initializing the new embedding vector with values learned from the features of the adaptation data.

7. The method of claim 1, wherein generating the adaptive audio-generation model comprises learning an encoder network that is configured to predict an embedding vector for a speaker when given adaptation data for the speaker.

8. The method of claim 7, wherein the encoder network comprises a summation of two subnetworks comprising 1) a pre-trained speaker verification model, and 2) a second sub-network comprising a plurality of convolutional layers configured to learn residual features of individual speakers.

9. The method of claim 1, further comprising:
   performing text-to-speech generation using the audio-generation model adapted for the new individual speaker, including using as input the learned new embedding vector and features of a new portion of text.

10. The method of claim 9, wherein performing text-to-speech generation comprises automatically generating audio of a translation of video or audio content, the audio of the translation being adapted to the characteristics of the new speaker.

11. The method of claim 9, wherein performing text-to-speech generation comprises automatically generating audio of a translation of speech during a video conference or a phone call, the audio of the translation being adapted to the characteristics of the new speaker.

12. The method of claim 1, wherein the training data comprises multiple hours of audio recordings for each individual speaker of the plurality of different individual speakers, and wherein the adaptation data comprises less than ten minutes of audio recordings of the new individual speaker.

13. The method of claim 1, wherein generating the adaptive audio-generation model comprises training the model in a datacenter, and
wherein adapting the audio-generation model for the new individual speaker comprises adapting the model on a mobile device or a single internet-enabled device.

14. A system comprising:
one or more computers and one or more storage devices storing instructions that are operable, when executed by the one or more computers, to cause the one or more computers to perform operations comprising:
generating an adaptive audio-generation model including learning a plurality of embedding vectors and parameter values of a neural network using training data comprising first text and audio data representing a plurality of different individual speakers speaking portions of the first text, wherein the plurality of embedding vectors represent respective voice characteristics of the plurality of different individual speakers; and
adapting the adaptive audio-generation model for a new individual speaker using adaptation data comprising second text and audio data representing the new individual speaker speaking portions of the second text, the new individual speaker being different from each of the plurality of individual speakers, wherein adapting the audio-generation model includes (i) learning values of a new embedding vector for the new individual speaker and (ii) adjusting the parameter values of the neural network that were learned during the generation of the adaptive audio-generation model.

15. The system of claim 14, wherein the audio-generation model adapted for the new individual speaker does not use any of the plurality of embedding vectors for the plurality of individual speakers in the training data.

16. The system of claim 14, wherein generating the adaptive audio-generation model comprises learning a different respective embedding vector for each of the plurality of individual speakers.

17. The system of claim 16, wherein adapting the adaptive audio-generation model comprises extracting features from the adaptation data and learning values of the new embedding vector that are most likely according to the learned parameter values of the audio-generation model.

18. The system of claim 16, wherein adapting the adaptive audio-generation model comprises extracting features from the adaptation data and using at least the extracted features to learn both values of the new embedding vector and new parameter values for the neural network.

19. The system of claim 18, wherein the operations further comprise:
pre-initializing the new embedding vector with values learned from the features of the adaptation data.

20. One or more non-transitory computer storage media encoded with computer program instructions that when executed by one or more computers cause the one or more computers to perform operations comprising:
generating an adaptive audio-generation model including learning a plurality of embedding vectors and parameter values of a neural network using training data comprising first text and audio data representing a plurality of different individual speakers speaking portions of the first text, wherein the plurality of embedding vectors represent respective voice characteristics of the plurality of different individual speakers; and
adapting the adaptive audio-generation model for a new individual speaker using adaptation data comprising second text and audio data representing the new individual speaker speaking portions of the second text, the new individual speaker being different from each of the plurality of individual speakers, wherein adapting the audio-generation model includes (i) learning values of a new embedding vector for the new individual speaker and (ii) adjusting the parameter values of the neural network that were learned during the generation of the adaptive audio-generation model.

* * * * *